United States Patent [19]

Miller et al.

[11] Patent Number: 5,603,074
[45] Date of Patent: Feb. 11, 1997

[54] PREPARATION AND USE OF TETRA-ALKYL COBALT DICARBOLLIDE FOR EXTRACTION OF CESIUM AND STRONTIUM INTO HYDROCARBON SOLVENTS

[75] Inventors: Rebecca L. Miller, Los Alamos; Anthony B. Pinkerton, Santa Fe; Kent D. Abney; Scott A. Kinkead, both of Los Alamos, all of N.M.

[73] Assignee: The Regents of the University of California, Los Alamos, N.M.

[21] Appl. No.: 412,384

[22] Filed: Mar. 28, 1995

[51] Int. Cl.$^6$ ................................................. C01F 11/00
[52] U.S. Cl. .......................... 423/2; 423/157; 423/181; 210/634
[58] Field of Search ............................ 423/2, 157, 181; 210/634

[56] References Cited

PUBLICATIONS

M. Frederick Hawthorne et al., "π–Dicarbollyl Derivatives of the Transition Metals. Metallocene Analogs," J. Am. Chem. Soc. 90, 879 (1968).

M. F. Hawthorne et al., "Icosahedral Carboranes and Intermediates Leading to the Preparation of Carbametallic Boron Hydride Derivatives," Inorg. Synth. X, 91 (1967).

T. L. Heying et al., "New Series of Organoboranes. III. Some Reactions of 2–Dicarbaclovododecaborane(12) and its Derivatives," Inorg. Chem. 2, 1097 (1963).

Miller, R. L. et al; Extraction of Cesium and Strontium into Hydrocarbon Solvents Using Tetra–C–Alkyl Cobalt Dicarbollide, 1995, Solvent Extra Ion Exch. 13(5), pp. 813–827.

Tran, Hong Ha, et al; Extraction of Cs, Sr and Ba into Nitrobenzene in the Presence of Cobalt Dicarbollide and Mono–n–Dodecyclethens of Polyethylene Glycol, Nucleon 2, 1993, pp. 6–9.

*Primary Examiner*—Ngoclan Mai
*Attorney, Agent, or Firm*—Samuel M. Freund

[57] ABSTRACT

Preparation and use of tetra-C-alkyl cobalt dicarbollide for extraction of cesium and strontium into hydrocarbon solvents. Tetra-C-alkyl derivatives of cobalt dicarbollide, $Co(C_2R_2B_9H_9)_2^-(CoB_2R_4^-; R=CH_3$ and $C_6H_{13}$) are demonstrated to be significant cesium and strontium extractants from acidic and alkaline solutions into non-toxic organic solvent systems. Extractions using mesitylene and diethylbenzene are compared to those with nitrobenzene as the organic phase. $CoB_2$-hexyl$_4^-$ in diethylbenzene shows improved selectivity ($10^4$) for Cs over Na in acidic solution. In dilute alkaline solution, $CoB_2$-hexyl$_4^-$ extracts Cs less efficiently, but more effectively removes Sr from higher base concentrations. A general synthesis of tetra-C-alkyl cobalt dicarbollides is described.

7 Claims, 6 Drawing Sheets

5,603,074

PREPARATION AND USE OF TETRA-ALKYL COBALT DICARBOLLIDE FOR EXTRACTION OF CESIUM AND STRONTIUM INTO HYDROCARBON SOLVENTS

FIELD OF THE INVENTION

The present invention relates generally to the separation of cesium and strontium from aqueous solution and, more particularly, to the extraction of cesium and strontium into hydrocarbon solvents from aqueous solution using tetra-C-alkyl cobalt dicarbollide. The invention was made with government support under Contract No. W-7405-ENG-36 awarded by the U.S. Department of Energy to the Regents of the University of California. The government has certain rights in the invention.

BACKGROUND OF THE INVENTION

Separation of cesium and strontium from nuclear waste is a pressing concern for both governments and the commercial nuclear power industry. During the first 30 years after irradiation of nuclear fuels, Cs and Sr contribute 98% of the thermal energy, and 97% of the penetrating radiation in the process waste. The most important fission-produced cesium isotope is $^{137}$CS (fission yield=6.19%), which has a half-life of 30.17 years, and decays by both $\beta$-(514 keV) and $\gamma$-(662 keV) emission. $^{\pi}$Sr (fission yield=5.8%) has a half-life of 29.1 years and decays by $\beta$-(546 keV) emission. These two elements dominate the immediate risks associated with nuclear waste, especially defense-related wastes. Separation of these elements is sometimes complicated by the high concentration of sodium in the waste, amounting to a Na/Cs mole ratio of $10^5$. A variety of fission products, especially transition metals, also cause problems. In order to reduce the risk to public health and prepare nuclear wastes for final disposition, selective and cost-effective separation procedures for these radionuclides must be devised. Removal of the major heat- and radiation-producing nuclides, $^{137}$CS and $^{90}$Sr, from high-level nuclear wastes also helps to reduce the cost of processing wastes for disposal, and to decontaminate wastes to low-level characteristics.

Proposed technologies for separation and recovery of Cs and Sr from nuclear waste streams often mention cobalt dicarbollide, $Co(C_2B_9H_{11})_2^-(CoB_2^-)$. However, application of cobalt dicarbollide to waste treatment has been deterred by the perception that highly toxic nitrobenzene is required as a diluent for the process.

Since 1976, attempts have been made to use cobalt dicarbollide in alternative solvents. The earliest report on cesium extraction using $H^+CoB_2^-$ demonstrated that dilution of the nitrobenzene solvent with basic solvents such as ethyl acetate, diisopropyl ether, or tert-butanol resulted in dramatic decreases in the cesium distribution coefficients. The mechanism of this depression in extraction efficiency is believed to be the formation of $H^+$ solvates in the organic phase, which prevents exchange of $H^+$ ions for $Cs^+$. By contrast, no decrease in $D_{Cs}$ was observed when nitrobenzene was diluted with benzene, trichloroethylene, or dichloromethane. Later reports showed that $D_{Cs}$ and the Cs/Rb selectivity both increased upon dilution of nitrobenzene with benzene or $CCl_4$. Unfortunately, cobalt dicarbollide is insufficiently soluble to function in mixtures of >60% nonpolar solvent in nitrobenzene and its losses into the aqueous phase strongly increase with content of nonpolar solvent. Because of the combined problems of basicity and solubility, successful $CoB_2^-$-based separations have only been achieved in exotic (expensive and having presently unknown toxicology) solvents such as nitrophenyl octyl ether and certain polyfluoroalkyl ethers. Since the extraction efficiency of cobalt dicarbollide does not directly depend on the polarity of the organic diluent, any nonbasic organic liquid should be an effective diluent for cobalt dicarbollide, provided the extractant is sufficiently soluble in that diluent. It should be noted that $H^+CoB_2^-$ is insoluble in hydrocarbons.

M. Frederick Hawthorne et al. in "$\pi$-Dicarbollyl Derivatives of the Transition Metals. Metallocene Analogs," J. Am. Chem. Soc. 90, 879 (1968), reported the first tetra-C-substituted cobalt dicarbollide complex, $[CO((CH_3)_2C_2B_9H_9)_2]^-(CoB_2^-Me_4^-)$. However, no attempt was made to study the extraction capabilities of this compound for Sr and Cs, and no attempt was made to study its solubility in organic solvents or lack thereof in water.

Accordingly, it is an object of the present invention to increase the solubility of derivatives of cobalt dicarbollide in nonbasic organic solvents.

Another object of the invention is to increase the solubility of derivatives of cobalt dicarbollide in nonbasic organic solvents without affecting the extraction efficiency thereof for Cs and Sr.

Yet another object of the invention is to increase the solubility of derivatives of cobalt dicarbollide in nonbasic organic solvents, while decreasing the solubility thereof in water, without affecting the extraction efficiency thereof for Cs and Sr.

Still another object another object of the present invention is to increase the solubility of derivatives of cobalt dicarbollide in nonbasic organic solvents, while decreasing the solubility thereof in water, without affecting the extraction efficiency thereof for Cs and Sr in the presence of high concentrations of sodium.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for removing cesium and strontium from aqueous solution of this invention includes the steps of contacting the aqueous solution with a solution of tetra-C-alkyl cobalt dicarbollide in an organic solvent, thereby permitting any Sr and Cs present to be extracted into the organic solution by the cobalt dicarbollide derivative, and separating the organic solution from the aqueous solution.

Preferably, the organic solution may be recycled by removing the Sr and Cs therein, and the steps repeated until the concentration of Sr and Cs are brought to a chosen level.

In another aspect of the present invention, in accordance with its objects and purposes, the method for preparation of tetra-C-alkyl cobalt dicarbollide hereof includes the steps of: reacting a solution of approximately one equivalent of $C_2B_{10}H_{12}$ with 2 equiv. of n-BuLi, thereby generating $Li_2(C_2B_{10}H_{10})$; reacting the $Li_2(C_2B_{10}H_{10})$ with approximately 2 equiv. of RX, where R is the desired alkyl group, and X is a chosen halogen atom, producing thereby a disubstituted o-carborane; refluxing the disubstituted o-carboranes in NaOH/EtOH, thereby generating dicarbollide ligand; deprotonating the substituted dicarbollide ligands with a strong base, forming substituted dicarbollide dianions; and treating the deprotonated substituted dicarbollide dianions with at least ¾ equiv. of $CoCl_2$, forming thereby substituted cobalt dicarbollide anions.

Benefits and advantages of the present invention include the use of extraction diluents which are nontoxic, inexpensive, and commonly available, the virtual elimination of organic contamination of aqueous feed streams since hydrocarbons are negligibly miscible with water, and low losses of extractant to the aqueous phase since tetra-C-alkyl cobalt dicarbollides have low solubility in water, particularly, as the length of the alkyl chain increases.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, tetra-C-alkyl derivatives of cobalt dicarbollide ($CoB_2$—$R_4^-$; $R=CH_3$ and $C_6H_{13}$) are shown to be effective extractants for Cs and Sr. Studies using acidic and alkaline Cs, Sr, and Na tracer solutions confirms that alkylation of the anion does not adversely affect its extraction characteristics. Moreover, $CoB_2$-$hexyl_4^-$ has been demonstrated to be an excellent extractant in aromatic hydrocarbon solvents. Its behavior compares favorably to that of cobalt dicarbollide in nitrobenzene, thereby providing a solvent extraction system for Cs and Sr that does not suffer from the toxicity hazard previously associated with solvents for cobalt dicarbollide.

Figure 1:
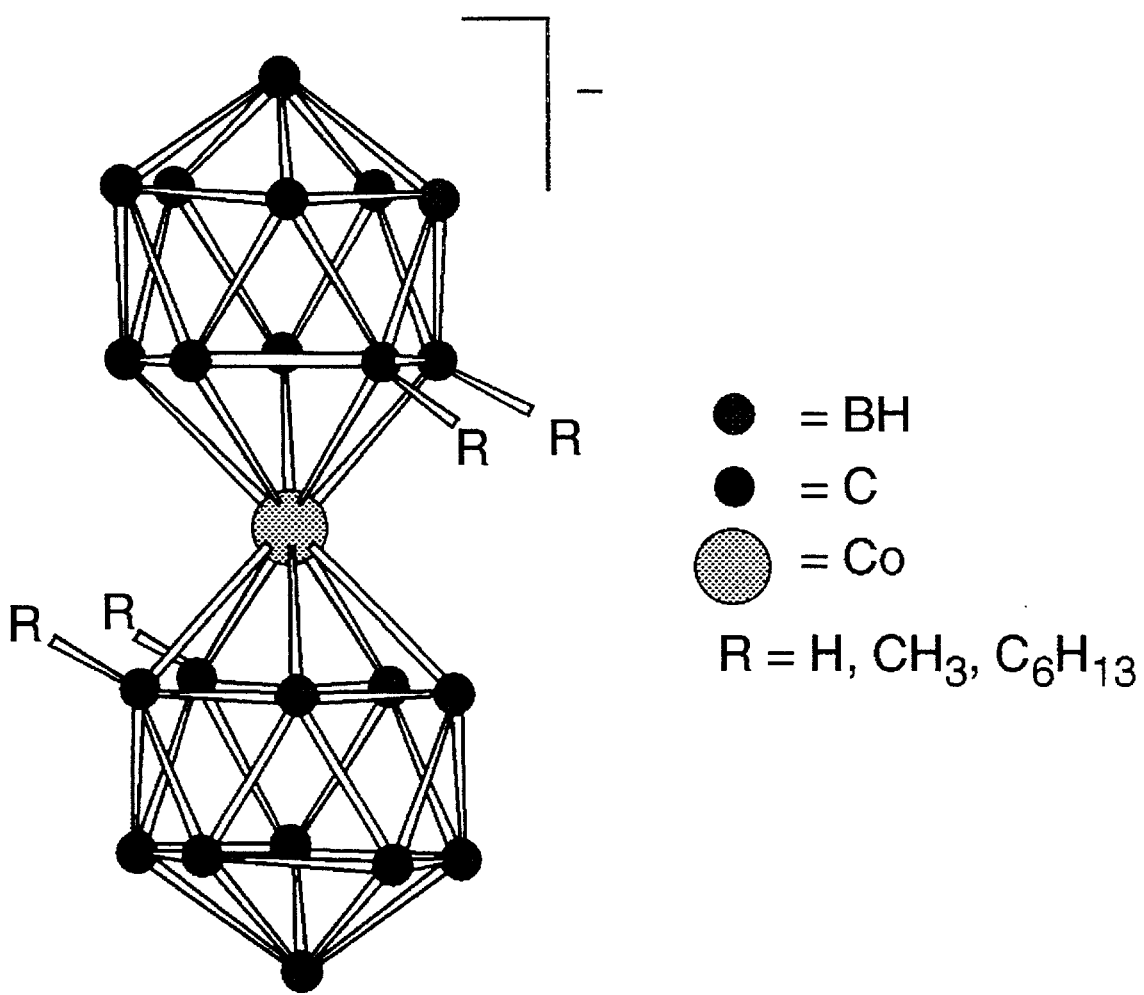
FIG. 1 is a schematic representation of the tetra-C-alkyl cobalt dicarbollide anion extractants of the present invention.

Unsubstituted cobalt dicarbollide was synthesized according to literature methods (See, e.g., M. F. Hawthorne et al., "Icosahedral Carboranes and Intermediates Leading to the Preparation of Carbametallic Boron Hydride Derivatives," Inorg. Synth. X, 91 (1967)). Instead of preparing dimethyl-o-carborane from decaborane and 2-butyne, and dihexyl-o-carborane from decaborane and dihexylacetylene, syntheses were initiated from o-carborane. That is, dimethyl-o-carborane and dihexyl-o-carborane were prepared by the reaction of $Li_2C_9B_{10}H_{10}$ with $CH_3I$ or $C_6H_{13}Br$, respectively (See, e.g., T. L. Heying et al., "New Series of Organoboranes. III. Some Reactions of 2-Dicarbaclovododecaborane(12) and its Derivatives," Inorg. Chem. 2, 1097 (1963)). A variety of substituted o-carboranes can be prepared by deprotonating the carbon sites of $C_2B_{10}H_{12}$ with 1 or 2 equivalents of n-BuLi. The intermediate, either $LiC_2B_{10}H_{11}$ or $Li_2C_2B_{10}H_{10}$ depending on the stoichiometry, behaves as a standard nucleophile toward alkyl halides, $CO_2$, epoxides, ketones, and other substrates. O-carborane is now readily available commercially, and numerous varieties of alkyl halides are quite common. Therefore, the present synthetic route is preferable to that involving decaborane and substituted acetylenes, the latter compound being unavailable commercially in all but the simplest forms. $(CH_3)_2C_2B_{10}H_{10}$ and $(C_6H_{13})_2C_2B_{10}H_{10}$ were converted to tetra-C-alkyl cobalt dicarbollides (See FIG. 1) by a method similar to that described in Hawthorne et al., supra, and isolated as their cesium salts. 0.01M solutions of $H^+CoB_2^-$, $H^+CoB_2$-$Me_4^-$ and $H^+CoB_2$-$hexyl_4^-$ were prepared by dissolving the cesium salt in the appropriate solvent, and shaking 12 times with equal volumes of 8N $H_2SO_4$.

Figure 2:
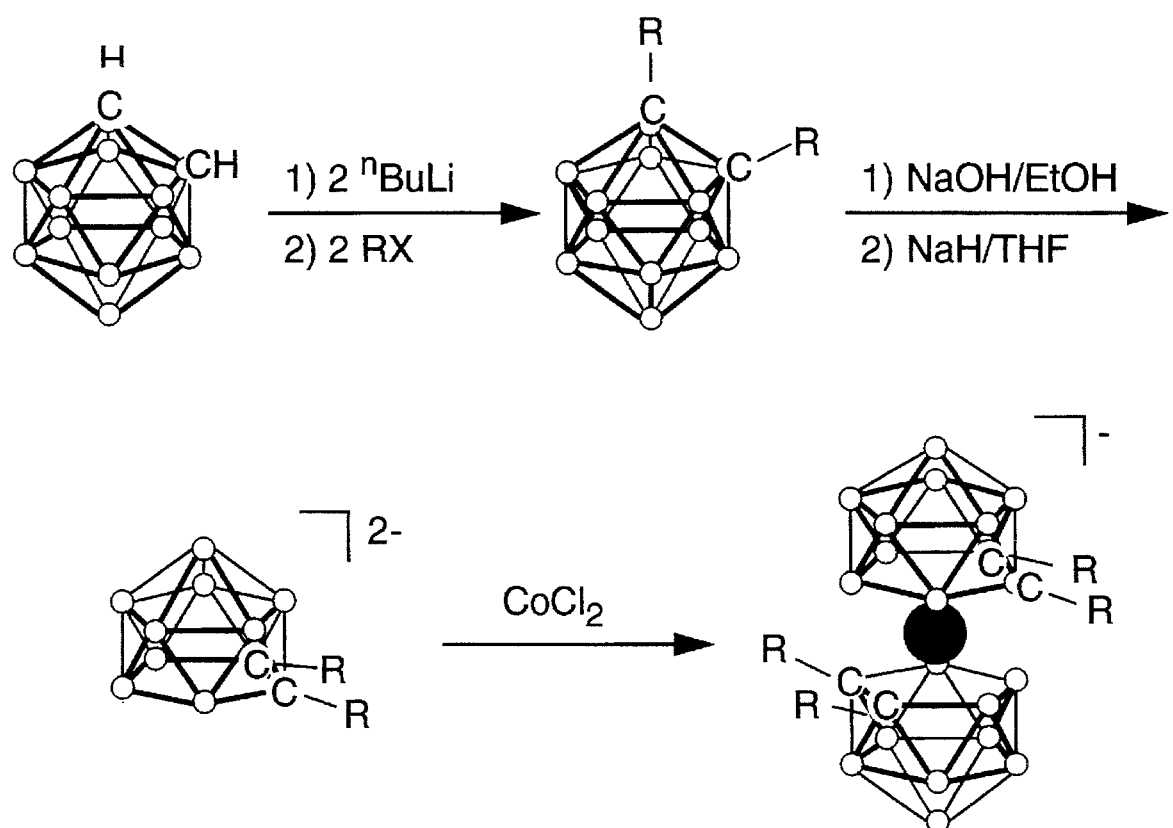
FIG. 2 illustrates the synthesis of the tetra-C-alkyl cobalt dicarbollide extractants of the present invention from o-carborane, where $R=CH_3$ and $C_6H_{13}$.

In slightly more detail, methyl and hexyl carboranes were prepared by the following route (See FIG. 2 hereof): $C_2B_{10}H_{12}$ was treated with 2 equiv. of n-BuLi in tetrahydrofuran (THF) generating sparingly soluble $Li_2(C_2B_{10}H_{10})$. The lithiated material was found to react rapidly with 2 equiv. of RX (MeI or hexyl-Br) to produce the corresponding disubstituted o-carborane. The methyl product was purified by recrystallization from acetone/water (77% yield). The hexyl carborane is a viscous liquid, purifiable by vacuum distillation (75–85% yield). All of the products are colorless and soluble in hydrocarbon and ethereal solvents. While the unsubstituted and dimethyl o-carboranes dissolve in more polar solvents such as acetonitrile, the hydrocarbon-like dihexyl-o-carborane is insoluble. The substituted o-carboranes were converted into dicarbollide ligands by refluxing with 6 equiv. of NaOH in ethanol for 3 d. No difficulties were encountered with the methyl and hexyl derivatives, and the ligands were isolated in 90–95% yields by precipitating from water as their $(CH_3)_3NH^+$ salts. Substituted cobalt dicarbollides, $CoB_2$-$Me_4^-$ and $CoB_2$-$hexyl_4^-$, were prepared in 5–7 g batches by deprotonating the substituted dicarbollide ligands with NaH in THF, then treating with $CoCl_2$ and refluxing for 18–22 h. In both cases, a red cobalt dicarbollide product was obtained, but the work-up procedure described by Hawthorne et al., supra, had to be altered slightly because Na[$CoB_2$-(hexyl)$_4$] was found to be insoluble in water. The THF solutions were filtered to remove cobalt metal and NaCl as usual, then evaporated to dryness. The substituted cobalt dicarbollides were dissolved in ether and washed repeatedly with water to remove all $CoCl_2$ and other salts. $Cs^+$ salts were precipitated by adding aqueous CsCl to an acetone solution of the substituted cobalt dicarbollide. Cs[$CoB_2$-$hexyl_4^-$] was recrystallized from acetone/water in 66% yield. Cs[$CoB_2$-$hexyl_4^-$] is a solid that melts slightly above room temperature (approx. 30° C.). Because of this melting behavior, it could not be purified by the usual recrystallization from hot acetone/water. Toluene solutions of Cs[$CoB_2$-$hexyl_4^-$] could, however, be heated to dryness in a beaker, and upon freezing with liquid nitrogen, a glassy, purple-black solid was obtained in 85% yield. Although all salts of $CoB_2$-hexyl$_4^-$ are insoluble in water, Cs[$CoB_2$-hexyl$_4^-$] has high solubility in low-polarity organics, including toluene and octanol.

In order to test the effectiveness of the tetra-C-alkyl cobalt dicarbollide extractants s of the present invention, $^{22}$Na, $^{137}$Cs and $^{85}$Sr radiochemical tracers were added to standardized solutions of nitric acid and sodium hydrochloride.

Distribution coefficients were measured by contacting 7.0 mL each of the organic and aqueous solutions for 60 s in screw-cap glass tubes. The mixtures were centrifuged to accelerate the phase disengagement, then 5.0 mL aliquots of the aqueous and organic fractions were transferred into 30 mL polyethylene counting vials. In experiments using $CoB_2$-hexyl$_4^-$/hydrocarbons with 0.01M NaOH, slow phase disengagement prevented sampling of the aqueous phase, so activity in the postcontact aqueous solution was determined by difference. Distribution measurements using $CoB_2$-hexyl$_4^-$ were duplicated using independently synthesized batches of extractant.

The gamma-radiation counting system was a standard Li-drifted Ge detector calibrated for geometry (a 30 mL counting vial containing 5 mL of solution) and distance from the detector. The 511 keV $\beta^+$ annihilation peak arising from the $^{22}$Na interfered with analysis of $^{85}$Sr (514 keV), so Sr and Na distribution coefficients were measured in independent experiments. Samples were counted in triplicate for 100 min., except where additional counting time was required to enhance the signal-to-noise ratio.

Figure 3:
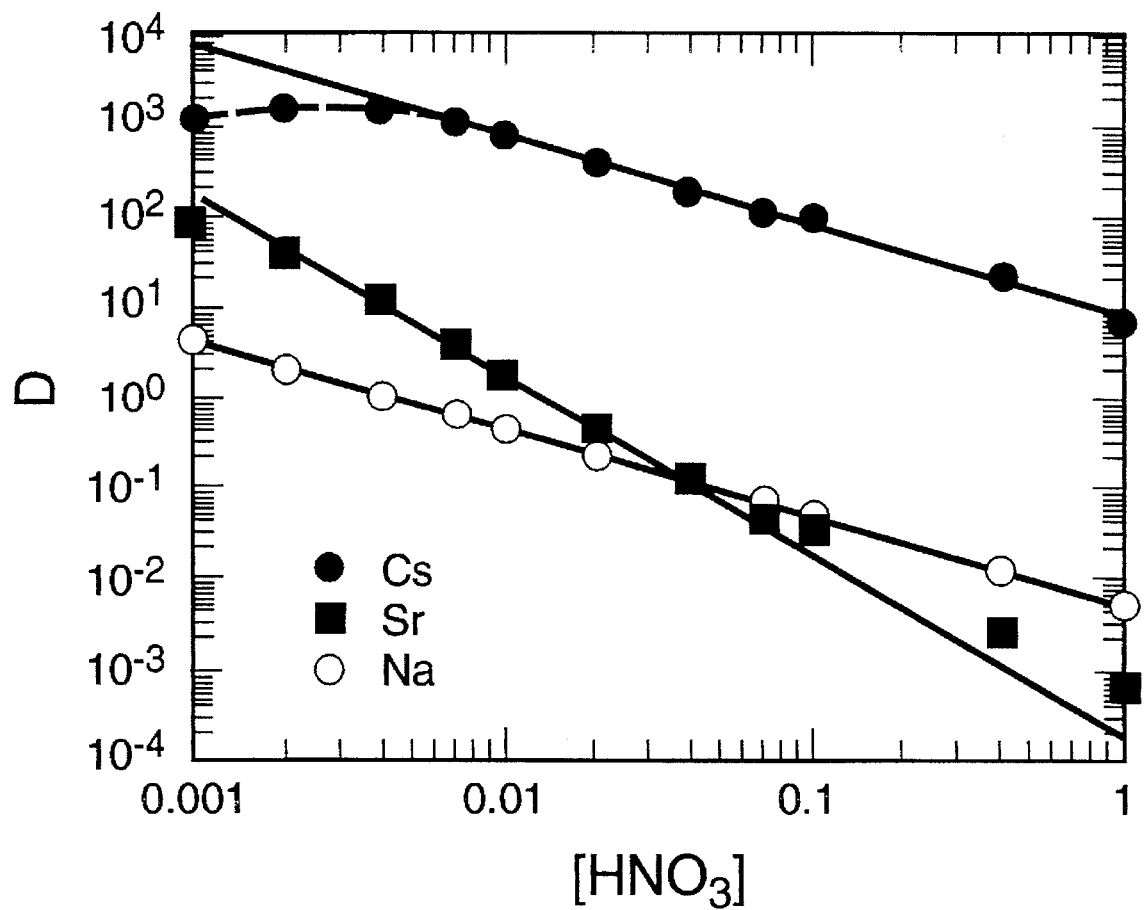
FIG. 3 shows the distribution coefficients for extraction of Cs, Sr and Na from nitric acid using 0.01M $H^+CoB_2^-$ in nitrobenzene.

Distribution coefficients for extraction of cesium, strontium, and sodium from 0.001–1.0M nitric acid, using 0.01M $H^+CoB_2^-$ in nitrobenzene, are plotted in FIG. 3 hereof. The straight lines for each ion $M^{n+}$ plotted in FIG. 3 were obtained by least-squares analysis, assuming the general equilibrium expression:

$$nH^+_{(org)} + M^{n+}_{(aq)} = nH^+_{(aq)} + M^{n+}_{(org)} \qquad (1)$$

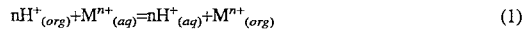

$$K_{eq}(M^{n+}) = [H^+_{(aq)}]^n[M^{n+}_{(org)}]/[H^+_{(org)}]^n[M^{n+}_{(aq)}] \qquad (2)$$

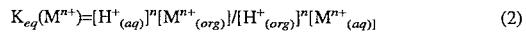

In these demonstrations, extraction of tracer-level $M^{n+}$ ($\approx 10^{-13}$M) produces a negligible change in the macroscopic $H^+$ concentrations in the organic phase, initially at 0.01M $H^+CoB_2^-$, and in the aqueous phase, initially 0.001–1.0M $HNO_3$. Thus, the equilibrium concentrations of free acid in each phase can be approximated using the known initial concentrations. Since the distribution coefficient $D_{Mn+}$ = $[M^{n+}_{(org)}]/[M^{n+}_{(aq)}]$, Eq. 2 can be rearranged to express the distribution coefficients as a function of the nitric acid concentration:

$$D_{Mn+} = K_{eq}(M^{n+})[H^+CoB_2^-]/[HNO_3]^n \qquad (3)$$

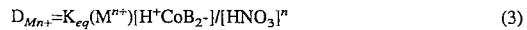

For the cations investigated, least-squares fitting to the following equations yielded the lines plotted in FIG. 3 and the corresponding equilibrium constants $K_{eq}(M^{n+})$ for distribution of the ion between water and nitrobenzene:

| | | |
|---|---|---|
| $D_{Cs} = K_{eq}(Cs) (0.01 M)/[HNO_3]$ | $K_{eq}(Cs) = 8(3) \times 10^2$ | (4) |
| $D_{Na} = K_{eq}(Na) (0.01 M)/[HNO_3]$ | $K_{eq}(Na) = 5(2) \times 10^{-1}$ | (5) |
| $D_{Sr} = K_{eq}(Sr) (0.01 M)^2/[HNO_3]^2$ | $K_{eq}(Sr) = 1.7(6)$ | (6) |

Strontium extraction by $H^+CoB_2^-$ in nitrobenzene has been reported to be intrinsically low. This problem has been solved by others by adding small amounts of polyethylene glycol (PEG) or a PEG derivative, thereby enhancing Sr extraction by a factor of $10^3$. Eight ethylene oxide units have been found to be optimal (PEG-400, Slovafol 909, or Triton-X114). The present inventors have not yet addressed the use of additives such as PEG, but instead have utilized $H^+CoB_2^-$/nitrobenzene measurements as a baseline for evaluating the extractants of the present invention.

The success in modeling the extraction behavior of cobalt dicarbollide in nitrobenzene with the simple equilibrium in Eq. 1 confirms that the selectivity of the extractant for "soft" cations is driven by two factors. First, the hydrophobicity of ions such as cesium increases their tendency to migrate into organic solvents; and second, the extraction of "hard" high-valent transition metal cations is further diminished with increasing acid strength, because of the $1/[H^+]^{n+}$ dependence of D.

Figure 4:
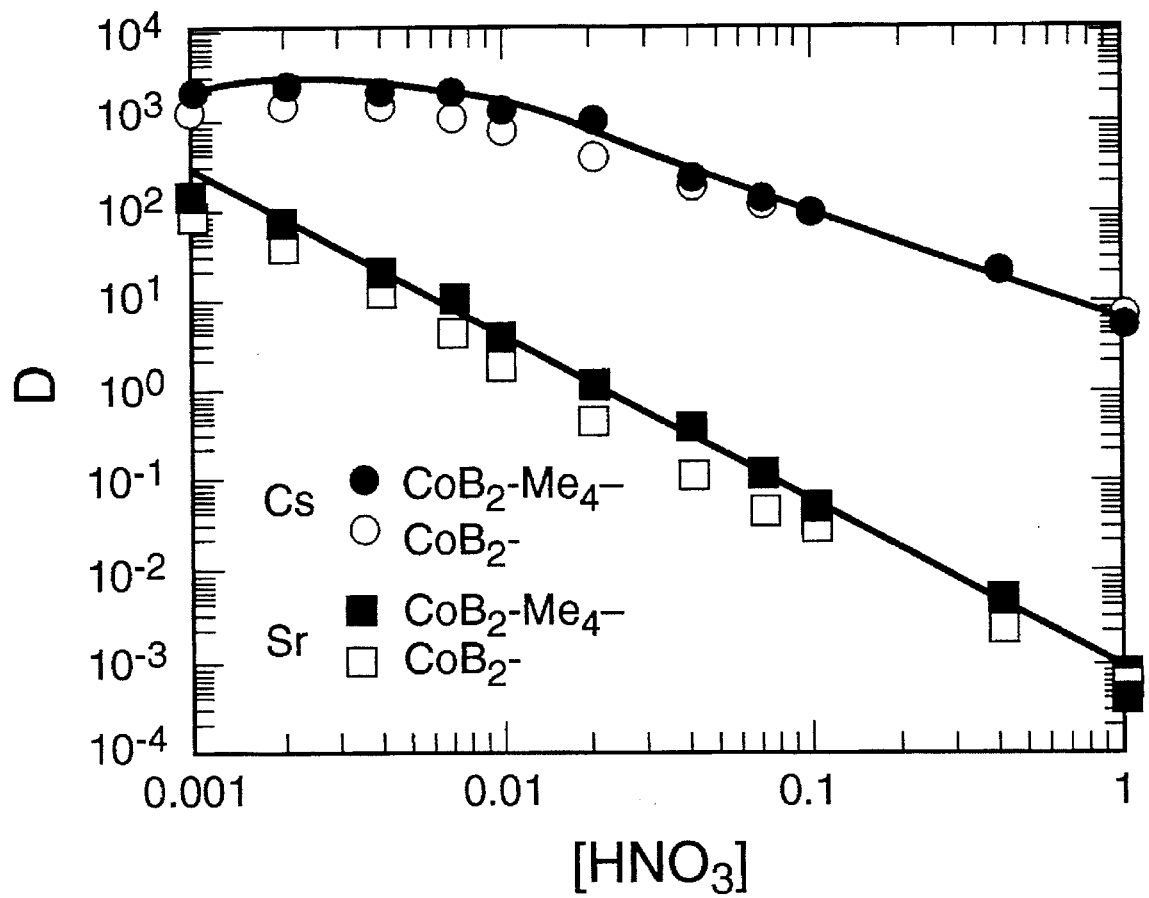
FIG. 4 shows the comparison of Cs and Sr distribution coefficients for extractions from nitric acid into nitrobenzene using 0.01M $H^+CoB_2$-$Me_4^-$ (filled markers) as compared with 0.01M $H^+CoB_2^-$ (empty markers).

Since the extraction of $M^{n+}$ is determined by the energetics of solvation of $M^{n+}$ by water vs. nitrobenzene, and not by a specific interaction with the anionic extractant, the precise nature of the anion is immaterial. A partial test of this hypothesis is provided by comparing the performance of the tetra-C-methyl analog, $H^+CoB_2$-Me$_4^-$, in nitrobenzene (FIG. 4). While the overall trends are identical, $H^+CoB_2$-Me$_4^-$ appears to marginally outperform $H^+CoB_2^-$ in all cases.

The source of this improvement may lie in the pretreatment of $Cs^+CoB_2^-$ with aqueous $H_2SO_4$ to convert the extractant to its free acid form. Cumulative transfers of small amounts of cobalt dicarbollide to the aqueous phase may lead to an overall decrease in extractant concentration that directly correlates to decreased $D_Mn+$. The molar solubilities of $Cs^+CoB_2^-$ and $Cs^+CoB_2$-Me$_4^-$ in $HNO_3$ and NaOH solutions have been measured for saturated solutions of each anion, and $CoB_2^-$ is three to four times more soluble in water than its methyl derivative.

Thus, the greater lipophilicity of $CoB_2$-Me$_4^-$ is likely sufficient to account for its increased D values. While $CoB_2$-Me$_4^-$ may not be a significantly better extractant than $CoB_2^-$, these studies indicate that alkylating the extractant will improve its performance on repeated extraction cycles by decreasing losses of the extractant to the aqueous phase. For this reason, it is especially interesting to note that alkali metal salts of $CoB_2$-hexyl$_4^-$ have been determined by the present inventors to be insoluble in aqueous media to within present detection limits.

The addition of long-chain alkyl groups was also expected to enhance the solubility of cobalt dicarbollide in nonpolar solvents. Indeed, $Cs^+CoB_2$-hexyl$_4_-$ is soluble in a variety of polar and nonpolar solvents. Although pure paraffinic hydrocarbons do not adequately solvate the charge of the complex, solutions of >1.0M $Cs^+CoB_2$-hexyl$_4^-$ can be prepared in aromatic hydrocarbons. Mesitylene and diethylbenzene were utilized as diluents for $CoB_2$-hexyl$_4^-$ extractions, because of reports recommending these as the most stable aromatic hydrocarbons for the liquid-liquid reprocessing of irradiated fuels. The ability of $CoB_2$-hexyl$_4^-$ to extract cesium and strontium into hydrocarbons (0.01M $H^+CoB_2$-hexyl$_4^-$ in mesitylene and diethylbenzene) was tested using 0.01, 0.1 and 1.0M nitric acid and sodium hydroxide solutions. These extractions are compared directly with the baseline system, $CoB_2^-$/nitrobenzene, in FIGS. 5 and 6, hereof. Extractions using the aromatic hydrocarbon solvents proceeded smoothly, except at 0.01M NaOH, where phase disengagement was very slew. Overall, the distribution coefficients for acid and base extractions are comparable in order of magnitude to the $CoB_2^-$/nitrobenzene system, although some notable exceptions are apparent.

Figure 5:
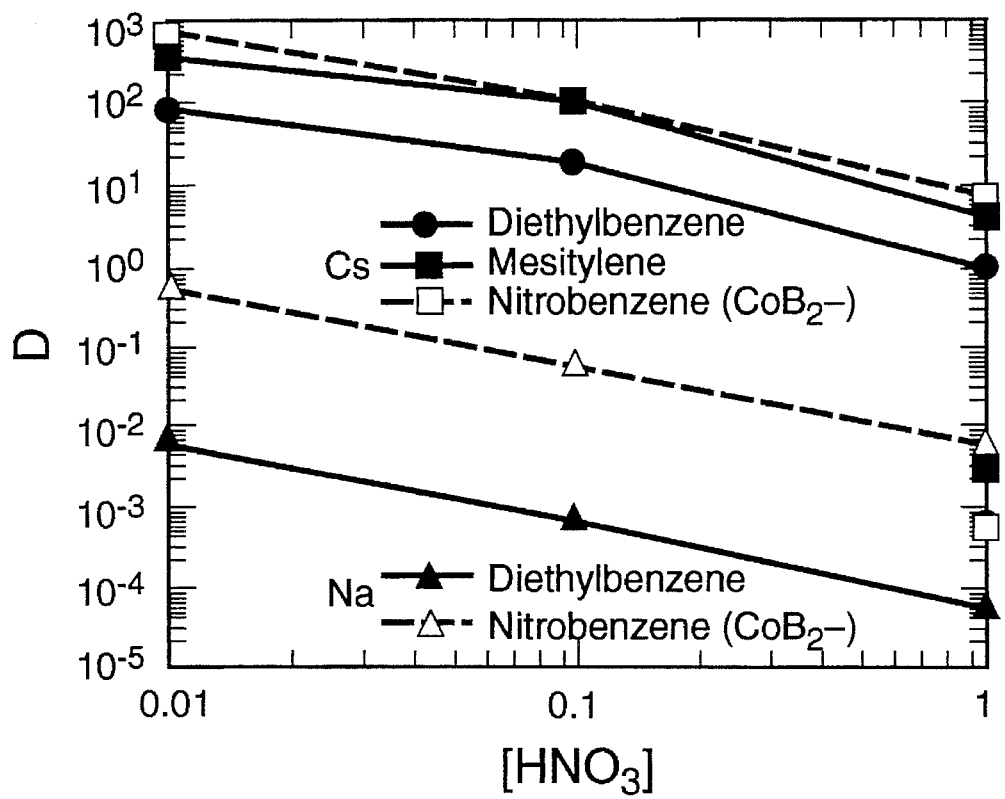
FIG. 5 shows the extraction of Cs, Sr and Na from acidic media using 0.01M $H^+CoB_2$-$hexyl_4^-$ in diethylbenzene and mesitylene (filled markers) as compared with extractions using 0.01M $H^+CoB_2^-$ in nitrobenzene (empty markers).
Figure 5:
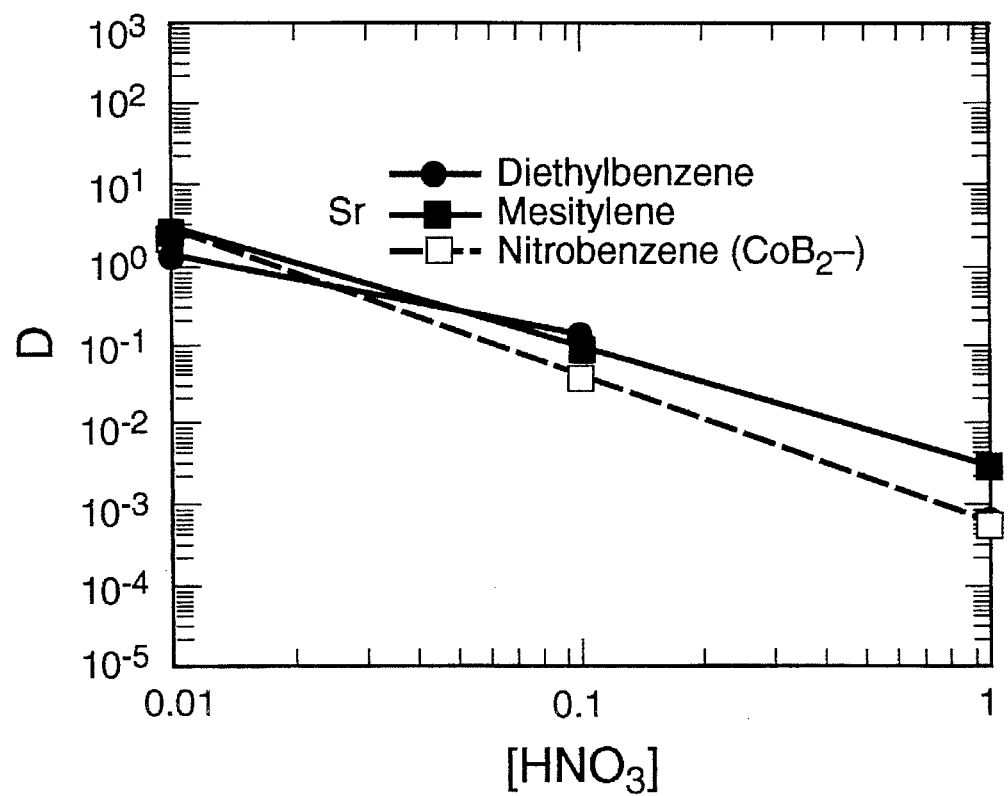
Figure 6:
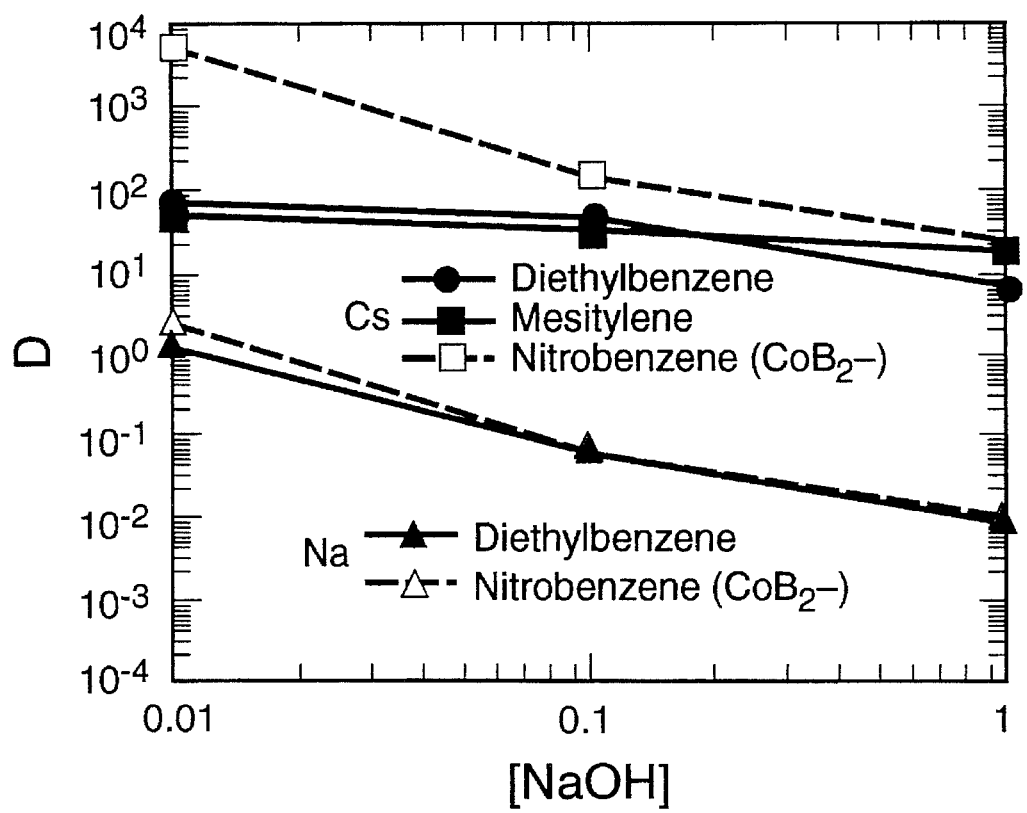
FIG. 6 shows the extraction of Cs, Sr and Na from alkaline media using 0.01M $H^+CoB_2$-$hexyl_4^-$ in diethylbenzene and mesitylene (filled markers) as compared with extractions using 0.01M $H^+CoB_2^-$ in nitrobenzene (empty markers).
Figure 6:
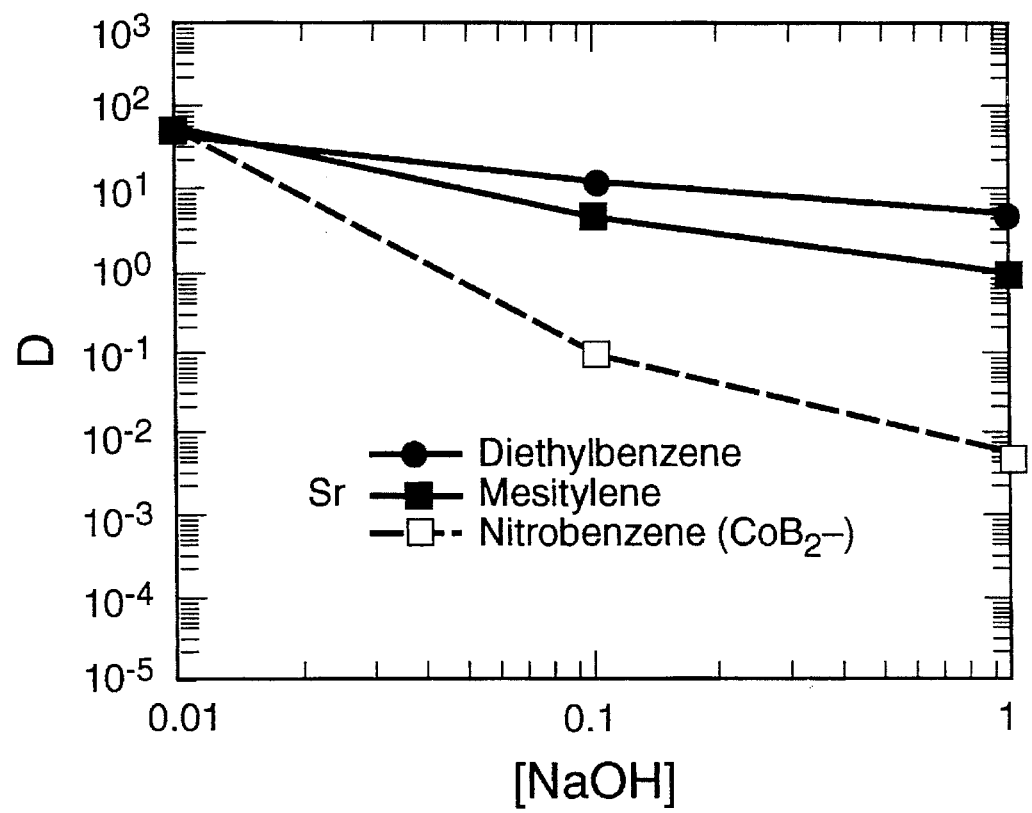

FIG. 5 depicts the extraction of Cs, Na and Sr from acidic solutions. Cesium and strontium extraction using the $CoB_2$-hexyl$_4^-$ system is comparable to the baseline nitrobenzene system, except for a 10-fold decrease in $D_{cs}$ for diethylbenzene. Interestingly, the sodium extraction in diethylbenzene is correspondingly decreased by a factor of 100; thus the selectivity for Cs over Na improves dramatically in the hydrocarbon solvent. This effect may be traced to the extremely poor solvation of sodium ions by the nonpolar solvent.

Extractions from alkaline media (FIG. 6) show more dramatic differences. D values for cesium and strontium for hydrocarbon extractants are much less dependent on NaOH concentration than the nitrobenzene system. Thus, cesium is less efficiently extracted from 0.01M NaOH(D~50 in hydrocarbons, vs. 5000 in nitrobenzene) but is not markedly affected by the increasing Na concentration up to 1.0M. By contrast, strontium extraction from 1.0M NaOH into diethylbenzene is improved by $10^3$, compared to nitrobenzene. Fortunately, sodium extraction remains minimal, so the system may be well-suited to treating high-sodium wastes.

While the extractant concentration in these experiments was low (0.01M), it is known that D values are directly proportional to cobalt dicarbollide concentration in nitrobenzene. It would appear then, that the $H^+CoB_2$-$hexyl_4^-$ concentration in the organic phase may be optimized for a given application. Extant work regarding cobalt dicarbollide extractions will assist the rapid implementation of $CoB_2$-$hexyl_4^-$ into nuclear waste processing schemes. Use of polyethylene glycol or a PEG derivative as a synergist for strontium extractions may also improve the extraction efficiency.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto,

What is claimed is:

1. A method for recovering strontium and cesium from aqueous solution, which comprises the steps of:
   a. contacting the aqueous solution with a solution of tetra-C-alkyl cobalt dicarbollide in an organic solvent, thereby permitting Sr and Cs present to be extracted into the organic solution by the cobalt dicarbollide derivative; and
   b. separating the organic solution from the aqueous solution.

2. The method for recovering strontium and cesium from aqueous solution, as described in claim 1, further comprising the step of recovering the Sr and Cs from the organic solution, thereby permitting the organic solution to be recycled.

3. The method for recovering strontium and cesium from aqueous solution, as described in claim 1, wherein the organic solvent includes aromatic hydrocarbons.

4. The method for recovering strontium and cesium from aqueous solution, as described in claim 3, wherein the aromatic hydrocarbons are selected from the group consisting of mesitylene and diethylbenzene.

5. The method for recovering strontium and cesium from aqueous solution, as described in claim 1, wherein the tetra-C-alkyl cobalt dicarbollide includes tetra-C-hexyl cobalt dicarbollide.

6. The method for recovering strontium and cesium from aqueous solution, as described in claim 2, wherein the steps of contacting the aqueous solution with an organic solution of tetra-C-alkyl cobalt dicarbollide, separating the organic solution from the aqueous solution, and recycling the organic solution, are repeated until a chosen concentration of Cs and Sr is obtained in the aqueous solution.

7. The method for recovering strontium and cesium from aqueous solution, as described in claim 1, wherein the step of contacting the aqueous solution with tetra-C-alkyl cobalt dicarbollide in an organic solvent is repeated with a fresh solution of tetra-C-alkyl cobalt dicarbollide in an organic solvent until a chosen concentration of Cs and Sr is obtained in the aqueous solution.

* * * * *